US005379851A

United States Patent [19]

[11] Patent Number: 5,379,851

[45] Date of Patent: Jan. 10, 1995

Huang

[54] POWER SCREWDRIVER

[76] Inventor: Chen S. Huang, 4F, No. 5, Alley 2, Lane 105, Min-An Road, Hsin-Chung City, Taipei Hsien, Taiwan, Prov. of China

[21] Appl. No.: 213,103

[22] Filed: Mar. 14, 1994

[51] Int. Cl.[6] .................................. B23Q 5/00

[52] U.S. Cl. .................................. 173/179; 173/93

[58] Field of Search .................. 173/176, 178, 179, 93; 192/0.034, 150, 0.033, 56 R

[56] References Cited

U.S. PATENT DOCUMENTS 3,904,305 9/1975 Boyd .................................. 173/179
4,359,107 11/1982 Smith .................................. 173/179
4,947,939 8/1990 Hang .................................. 173/179
5,082,066 1/1992 Schoeps .................................. 173/178

FOREIGN PATENT DOCUMENTS 604734 9/1960 Canada .................................. 173/179

*Primary Examiner*—Scott A. Smith
*Attorney, Agent, or Firm*—Notaro & Michalos

[57] ABSTRACT

A power screwdriver disclosed includes a housing, a reversible motor, a screw-driving device, a transmitting shaft, and a handle. The screw-driving device includes a centrifugal clutch, a rotor and an engaging set. The shaft is connected to the motor at one end and to the rotor at the other end so as to transmit rotating power from the motor to the rotor. The screwdriver automatically switch screwing actions in accordance with the rotating speed thereof.

6 Claims, 6 Drawing Sheets

POWER SCREWDRIVER

FIELD OF THE INVENTION

The present invention relates generally to a power screwdriver and more particularly to a structure capable to automatically switch screwing actions.

BACKGROUND OF THE INVENTION

Conventionally, a screwdriver is generally operated manually and cooperated with various scales and types of screwing tips for different purposes. But, it is exhausted and takes time to utilize a manual screwdriver to tie up or disengage a screw.

SUMMARY OF THE INVENTION

Accordingly, it is a primary object of the present invention to provide a power screwdriver to overcome the problem of the prior art.

It is another object of the present invention to provide a power screwdriver which structure is capable to automatically switch screwing actions.

In accordance with the objects, the power screwdriver of the present invention comprises a housing, a reversible motor, a screw-driving device, a transmitting shaft, and a handle which is securely connected to the housing at one end. The motor, the screw-driving device, and the shaft are disposed within the housing. The shaft is connected to the motor at one end and to the screw-driving device at the other end. The handle is mounted with a power trigger to actuate the motor and a light switch to control a light tube which is disposed within the housing.

When the motor is triggered by depressing the trigger, via the connection provided by the shaft, the screw-driving device is rotated by the motor so as to screw up an engaged working piece.

When fastened, the working piece thus acts against the screw-driving device and slows down its rotation to stop screwing.

The above objects, features and advantages of the invention will become readily apparent from the following detailed description thereof which is to be read in connection with the accompanying drawings.

DETAILED DESCRIPTION OF THE PREFERRED EMBODIMENT

Figure 1:
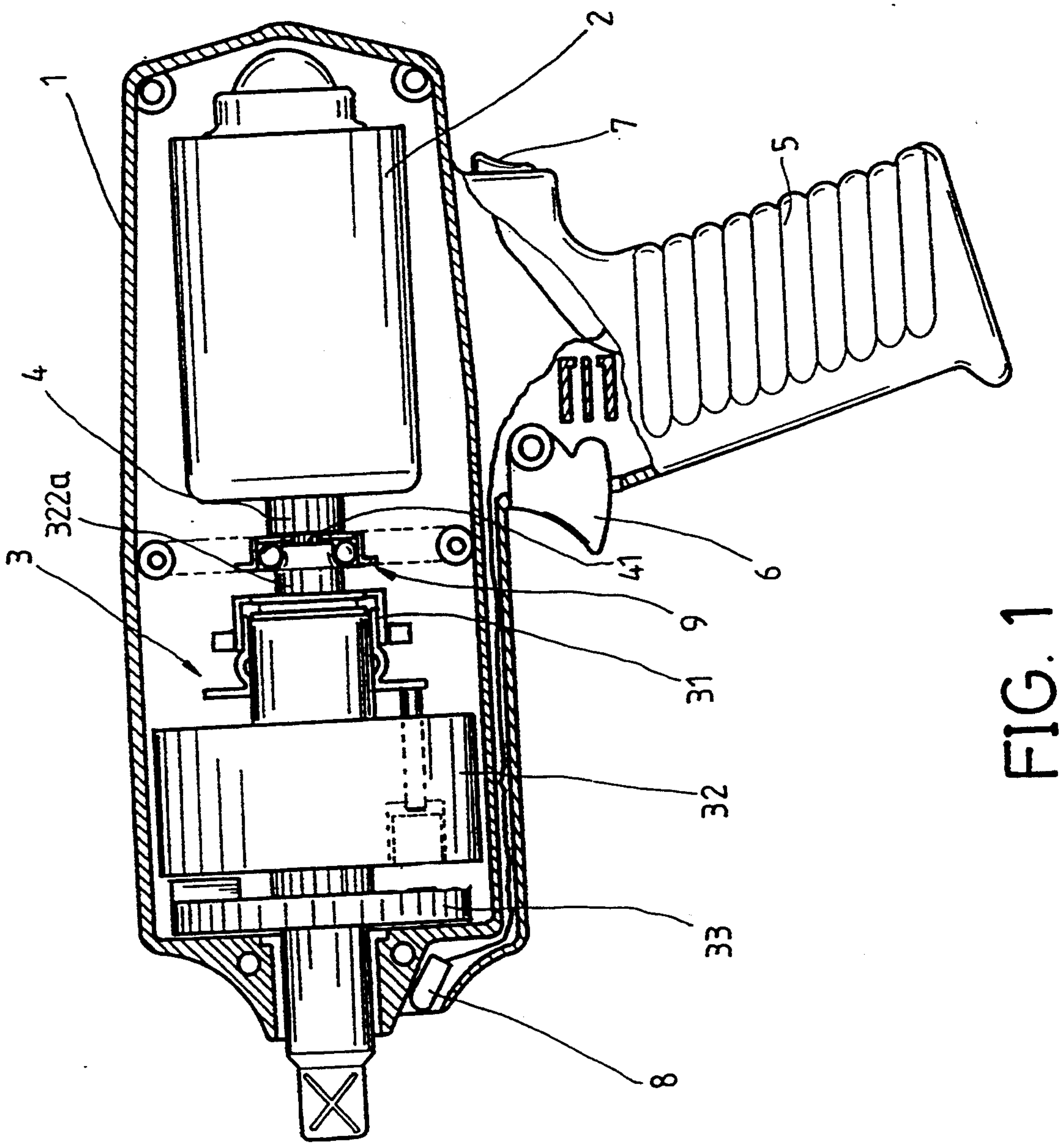
FIG. 1 is a side elevational view, partially broken, of a power screwdriver in accordance with a first embodiment of the present invention.
Figure 2:
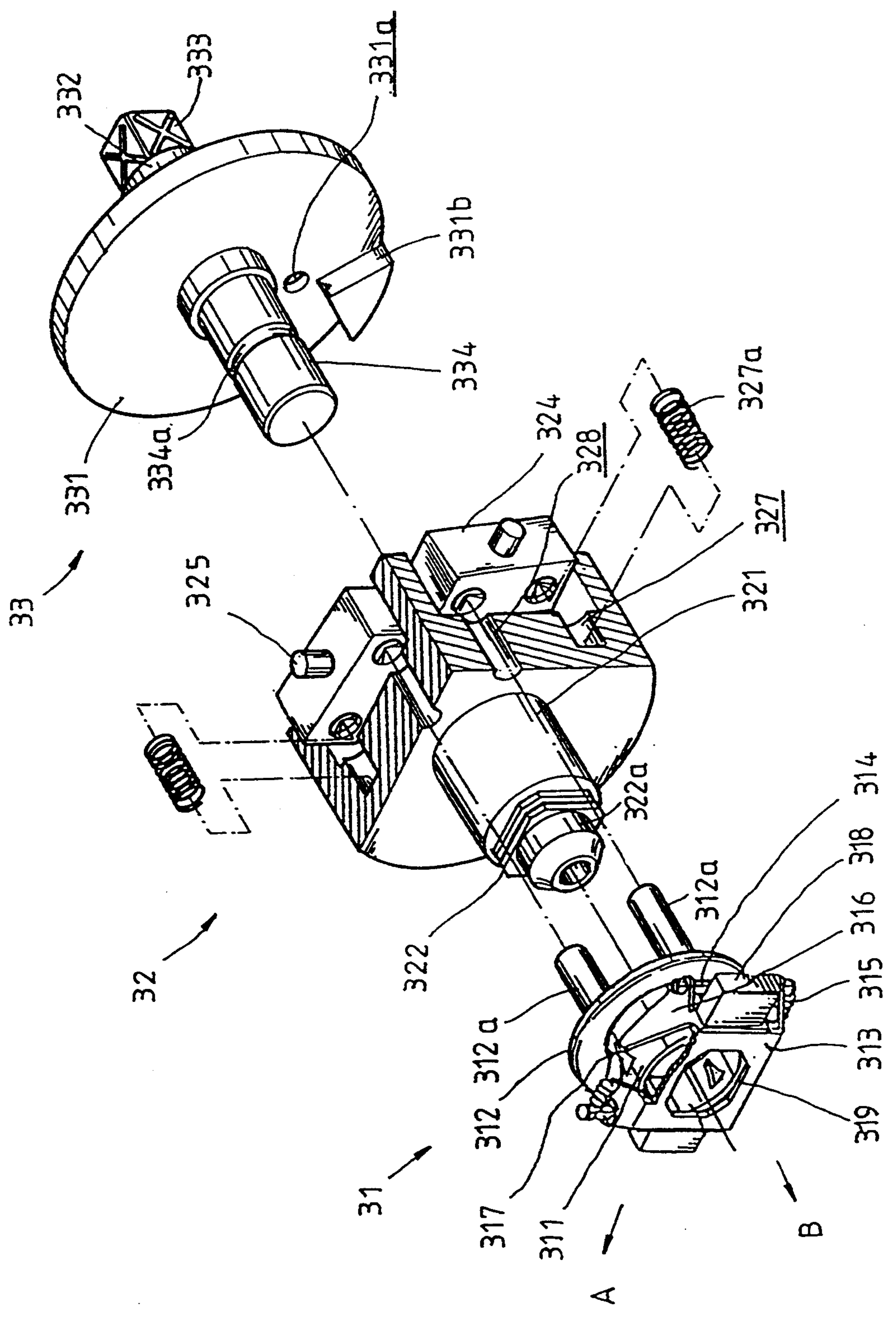
FIG. 2 is an exploded perspective view of a screw-driving device of the power screwdriver in accordance with a first embodiment of the present invention.
Figure 3:
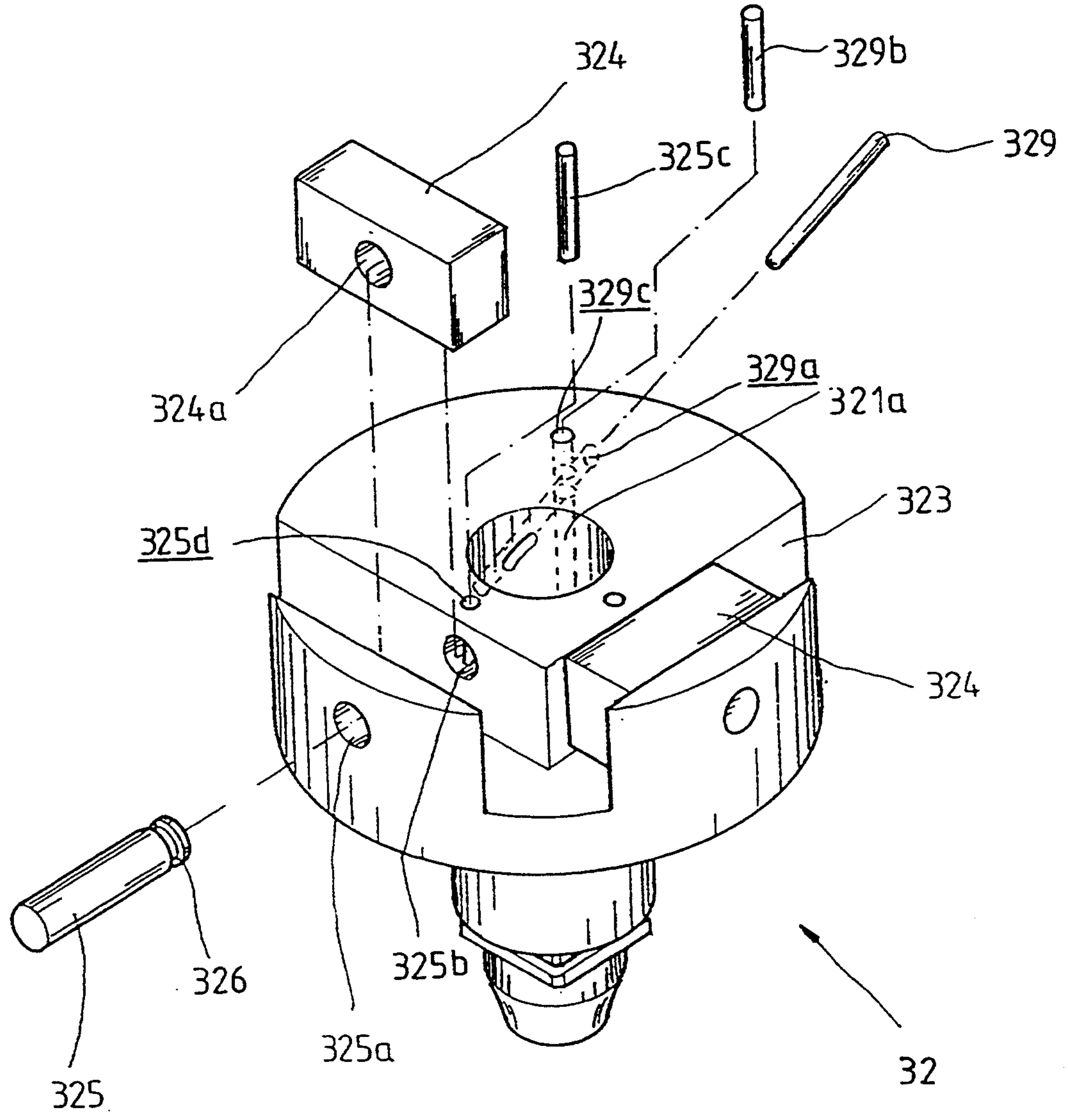
FIG. 3 is an exploded perspective view of a rotor of the screw-driving device of the power screwdriver in accordance with a first embodiment of the present invention.

Referring to FIGS. 1 and 2, a power screwdriver constructed in accordance with a first embodiment of the present invention comprises a housing 1, power means, such as a reversible motor 2, a screw-driving device 3, a transmitting shaft 4, and a handle 5 which is securely connected to the housing 1 externally at one end The screw-driving device 3 includes a centrifugal clutch 31, a rotor 32 and an engaging set 33. The shaft 4 is securely connected to the motor 2 at one end and at the other end has a front head 41 engageably receivable within a cone-shaped connecting ring **322*a* of the rotor 32 so that the shaft 4 transmits rotating power from the motor 2 to the rotor 32. The engagement between the front head 41 and the connecting ring 322*a* is further securely fastened by ball bearings 9 to stabilize the rotating of the rotor 32. The motor 2, the screw-driving device 3, and the shaft 4 are disposed within the housing 1. The handle 5 is mounted with a power trigger 6 in the front side thereof to actuate the motor 2 and a light switch 7 in the rear side thereof to control a light tube 8 which is disposed within the housing 1**.

The centrifugal clutch 31 of the screw-driving device 3 comprises a connecting tube 311, a ring 312 slidably fitting over the tube 311 and having two cylindrical supporting posts **312*a* securely attached thereto, a pair of springs 315, a bracket 313 fastened around the tube 311 by a pair of pins 314 which are connected therebetween by the pair of springs 315, two pairs of strips 316, a movable pointer 317 with each pair of strips 316 respectively pivoted to the pair of pins 314 at one end and cooperate at the other end to hold the movable pointer 317, a pair of weights 318 which are releasably connected to two respective sides of the bracket 313 and contact the strips 316 at one end, and a locking opening 319. When the centrifugal clutch 31 rotates, the resultant centrifugal force moves the weights 318 outward radially as shown by arrow A so as to move the coupling strips 316 in such a way to push the pointer 317 away from the ring 312 as shown by arrow B and at the same time elongate the springs 315. When the rotating speed of the centrifugal clutch 31 is reduced, the restoring force resulting from the stretched springs 315 restores the coupling strips 316 and the pointer 317** back to their original positions.

Referring to FIGS. 1, 2, 3, and 4, the rotor 32 of the screw-driving device 3 comprises a mounting collar 321 securely attached to the bottom surface of the rotor 32 at one end thereof and having the connecting ring **322*a* at the other end thereof with a pair of locking plates 322 fitted thereover. The mounting collar 321 is receivable within the tube 311 with one of the locking plates 322 passing through the locking opening 319 of the centrifugal clutch 31 in order to rotatably lock with the bracket 313 and have the locking opening 319 located between the pair of locking plates 322 so that the centrifugal clutch 31 rotates in unison with the rotor 32. The rotor 32 further comprises a centered recess 321*a* (see FIG. 3) and two hitting blocks 324 respectively disposed within two slots 323 formed on the top surface of the rotor 32 and preferably perpendicular to each other. Each of the blocks 324 is pivotally retained to the rotor 32 by a rod 325 and a first bar 325*c*. The rod 325 extends through a first hole 325*a* on one side wall of the respective slot 323, a second hole 324*a* of the block 324, and a third hole 325*b*** on the second side wall of the respective slot 323. The first bar 325c extends through a fourth hole 325d on the top surface of the rotor 32 to be partially received within a first annular slot 326 of the rod 325. Below each of the slots 323a, the rotor 32 receives a compressed spring 327a within a dip 327 and the supporting post 312a of the centrifugal clutch 31 within a aperture 328. The locations of the dip 327 and the aperture 328 are preferably arranged so that the compressed spring 327a and the supporting post 312a control the hitting block 324 to do a rocking action.

Figure 5:
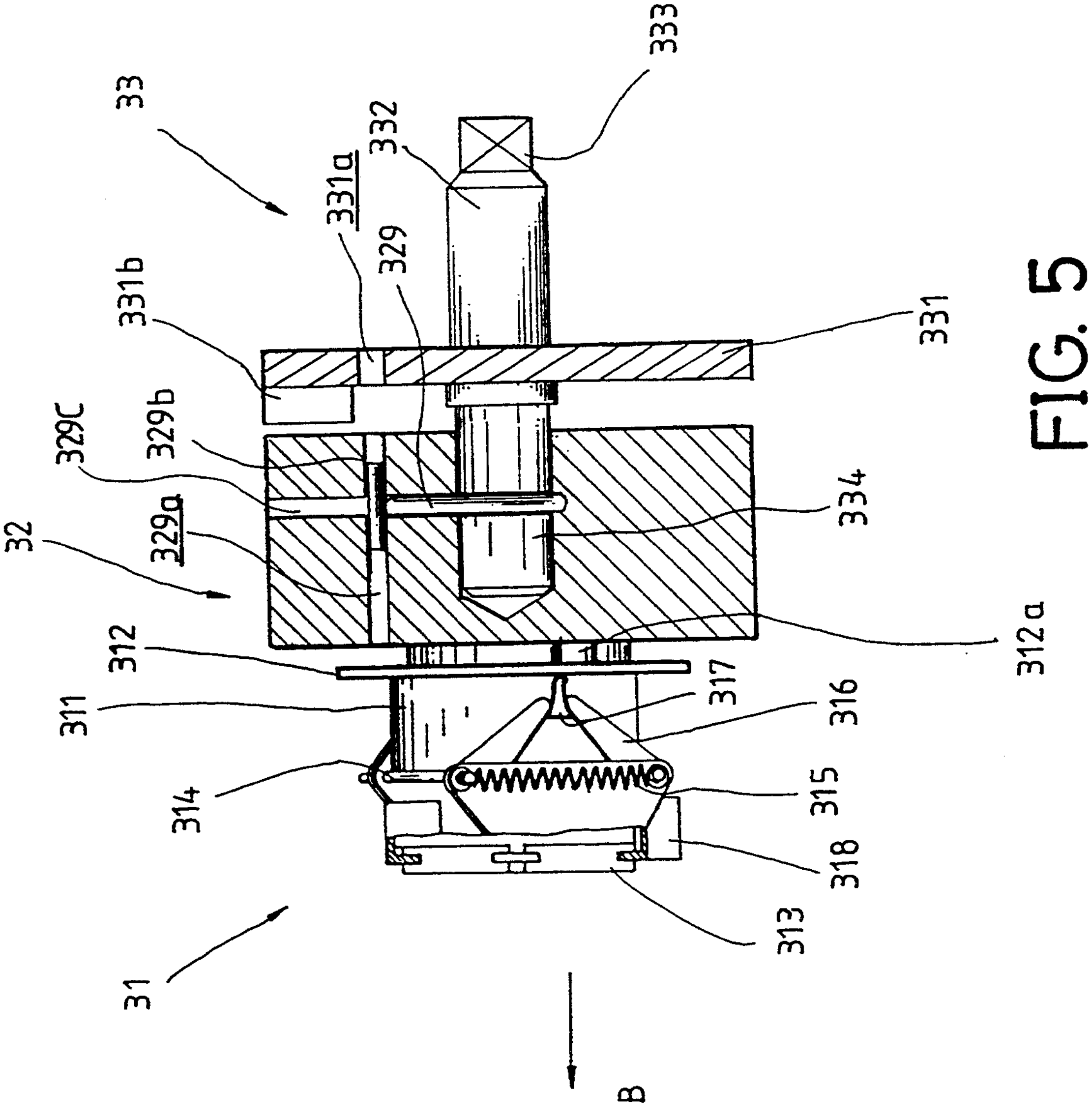
FIG. 5 is another side elevational view similar to FIG. 4.

The engaging set 33 of the screw-driving device 3 comprises a disk 331 having a target block 331b which shape is designed to meet that of the hitting block 324 for receiving possible hitting from the block 324, a spindle 332, which is fixed to the center of the disk 331, having a screw chuck 333 attached thereto at the front end thereof in which the screw chuck 333 is used to connect various scales and types of screwing tips (not shown in the drawings). The engaging set 33 further comprises a connector 334, which is secured to the rear end of the spindle 332 and is receivable within the centered recess 321a of the rotor 32. As shown in FIG. 5, the connector 334 is securely retained to the rotor 32 by a second bar 329 extending through a fifth hole 329c on the circumference of the rotor 32 to be partially received within a second annular slot 334a of the connector 334 and by a third bar 329b extending through a sixth hole 331a of the disk 331 and a seventh hole 329a on the top surface of the rotor 32.

Figure 4:
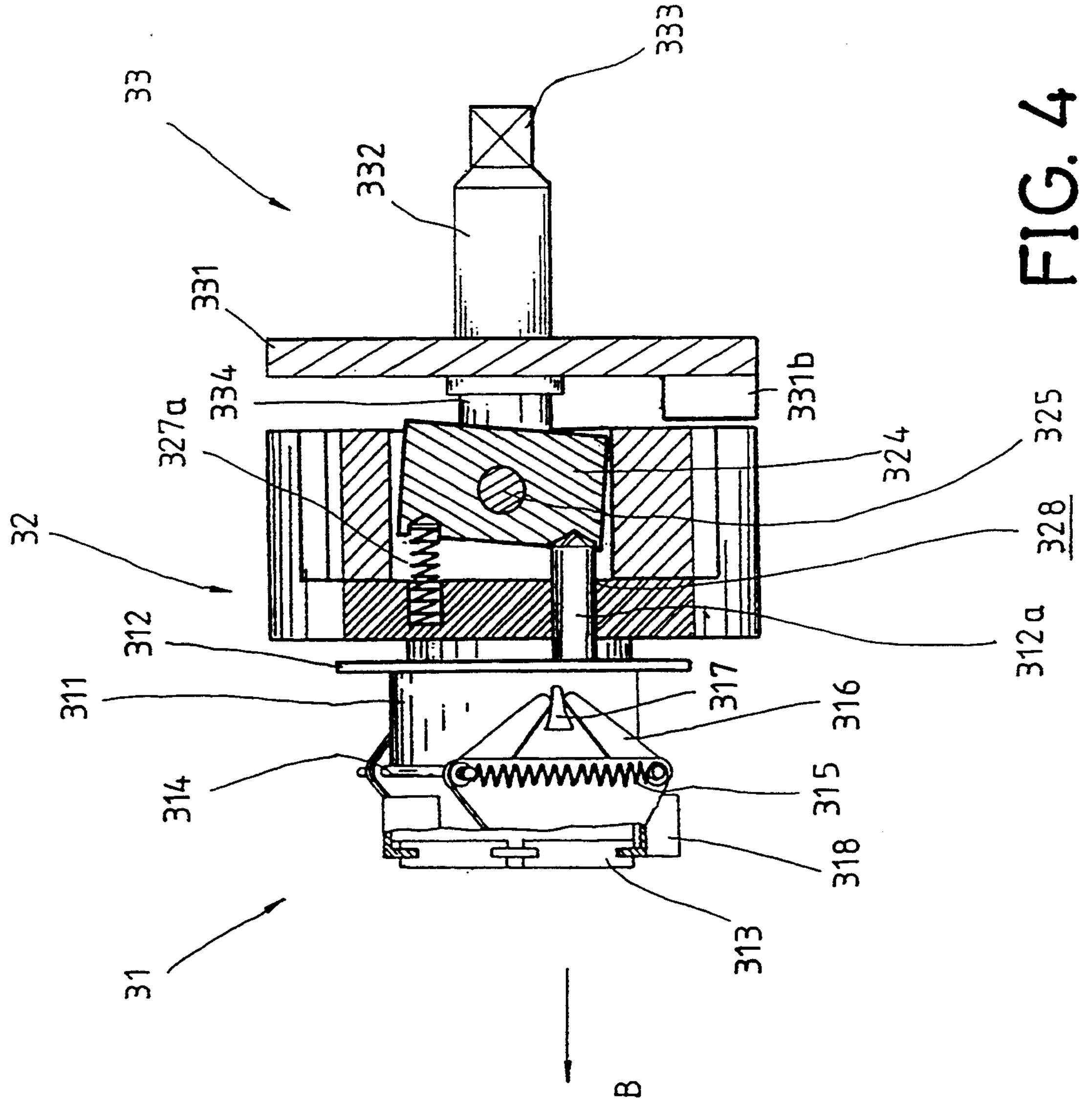
FIG. 4 is a side elevational view, partially broken, of the screw-driving device of the power screwdriver in accordance with a first embodiment of the present invention.

Referring to FIGS. 1, 2, and 4, when the motor 2 is triggered by depressing the power trigger 6, the centrifugal clutch 31 and the rotor 32 are rotated in unison by means of the transmitting shaft 4. When the rotating speed increases, the resultant centrifugal force generated as a result of the rotation of the centrifugal clutch 31 moves the weights 318 outward radially as shown by arrow A in FIG. 2 to move the coupling strips 316 in such a way to push the pointers 317 away from the ring 312 as shown by arrow B and at the same time elongate the springs 315 so that the compressed springs 327a stretch out to push one side section of the hitting blocks 324 upward to hit the target block 331b of the engaging set 33. Then, the engaging set 33 and the screw chuck 333 are rotated so as to screw up an engaged working piece (not shown in drawings).

On the other hand, referring to FIG. 5, when fastened, the working piece thus acts against the engaging set 33 to slow down the rotation of the rotor 32 and the centrifugal clutch 31. Then, the restoring force resulting from the stretched springs 315 restores the coupling strips 316 and the pointers 317 back to their original positions so as to push the other side section of the hitting blocks 324 upward to balance the hitting blocks 324 horizontally and the engaging set 33 stops screwing.

Figure 6:
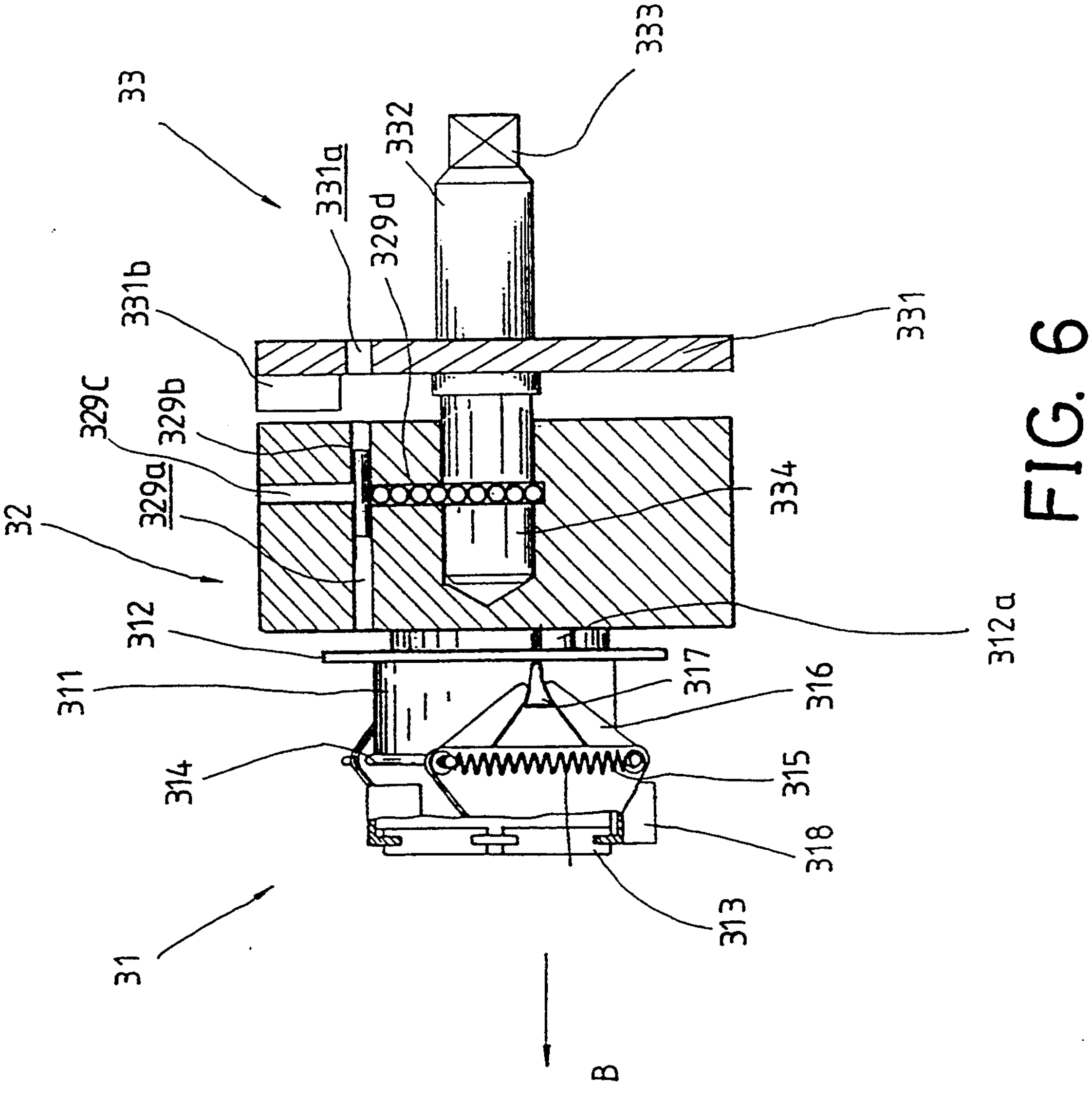
FIG. 6 is a side elevational view similar to FIG. 5 showing the screw-driving device of the power screwdriver in accordance with a second embodiment of the present invention.

FIG. 6 shows a second embodiment of the present invention, wherein the second bar 329 is replaced by a plurality of balls 329d to perform the same function of securely fastening the connector 334 of the engaging set 33 to the rotor 32.

Having described the specific preferred embodiments of the present invention with reference to the accompanying drawings, it will be appreciated that the present invention is not limited to that precise embodiments and that various changes and modifications can be effected therein by one of ordinary skill in the art without departing from the scope or spirit of the invention as defined by the appended claims.

What is claimed is

1. A power screwdriver comprising a housing; power means; a screw-driving device comprising a centrifugal clutch, a rotor, and an engaging set; a transmitting shaft securely connected to the power means at one end thereof and to the screw-driving device at the other end thereof so as to transmit the rotating power from the power means to the screw-driving device; the power means, the screw-driving device, and the shaft being disposed within the housing; and a handle which is securely connected to the housing externally at one end thereof and is mounted with a power trigger to actuate the power means; the centrifugal clutch comprising a connecting tube, a ring slidably fitting over the tube and having two supporting posts securely attached thereto, a pair of springs, a bracket fastened over the tube by a pair of pins which are connected therebetween by the pair of springs, two pairs of strips, a movable pointer, each pair of strips being respectively pivoted to the pair of pins at one end and cooperating at the other end to hold the movable pointer, a pair of weights which are releasably connected to two respective sides of the bracket and contact the strips at one end; the rotor, which securely locks with the centrifugal clutch to cause the centrifugal clutch to rotate in unison with the rotor, comprising two hitting blocks respectively disposed within two slots on a top surface of the rotor and pivotally connected thereto; below each of the slots, the rotor receiving a compressed spring within a dip and the supporting post of the centrifugal clutch within a aperture so that the compressed spring and the supporting post control each corresponding hitting block to do a rocking action; the engaging set comprising a disk with a target block mounted thereon, a spindle which is securely fixed to the center of the disk having a screw chuck attached thereto at a front end thereof, and a connector which is securely engaged with a rear end of the spindle and is receivable within a centered recess of the rotor so that when the power means are triggered by depressing the power trigger, the centrifugal clutch and the rotor are rotated in unison and when the rotating speed increases, the resultant centrifugal force generated as a result of the rotation of the centrifugal clutch moves the weights outward radially to move the strips in such a way to push the movable pointers away from the ring and at the same time elongate the springs and then the compressed springs stretch out to push one side section of the hitting blocks upward to hit the target block on the disk of the engaging set so as to rotate the engaging set and the screw chuck to screw up an engaged working piece and on the other hand, when fastened, the working piece thus acts against the engaging set to slow down the rotation of the rotor and the centrifugal clutch and the restoring force resulting from the stretched springs restores the coupling strips and the pointers back to their original positions and the engaging set stops screwing.

2. A power screwdriver as claimed in claim 1, wherein the rotor further comprises a mounting collar securely attached to the bottom surface of the rotor at one end thereof and having a connecting ring at the other end thereof with a pair of locking plates fitted thereover and receivable within the connecting tube of the centrifugal clutch with one of the locking plates passing through a locking opening of the centrifugal clutch in order to rotatably lock with the bracket and have the locking opening located between the pair of locking plates.

3. A power screwdriver as claimed in claim 2, wherein the transmitting shaft comprises a head engageably receivable within the connecting ring of the rotor so that the shaft transmits rotating power from the power means to the rotor and the engagement between the head and the connecting ring is further securely fastened by ball bearings to stabilize the rotating of the rotor.

4. A power screwdriver as claimed in claim 1, wherein each of the hitting blocks is pivotally retained to the rotor by a rod extending through a first hole on one side wall of the respective slot, a second hole of the hitting block, and a third hole on the second side wall of the respective slot and a first bar extending through a fourth hole on the top surface of the rotor to be partially received within a first annular slot of the rod.

5. A power screwdriver as claimed in claim 1, wherein the connector of the engaging set is securely retained to the rotor by a second bar extending through a fifth hole on the circumference of the rotor to be partially received within a second annular slot of the connector and by a third bar extending through a sixth hole of the disk and a seventh hole on the top surface of the rotor.

6. A power screwdriver as claimed in claim 1, wherein the connector of the engaging set is securely retained to the rotor by a plurality of balls passing through a fifth hole on the circumference of the rotor to be partially received within a second annular slot of the connector and by a third bar extending through a sixth hole of the disk and a seventh hole on the top surface of the rotor.

* * * * *